(12) United States Patent
Bitterlich et al.

(10) Patent No.: US 7,514,383 B2
(45) Date of Patent: Apr. 7, 2009

(54) MATERIALS BASED ON SIALON'S

(75) Inventors: Bernd Bitterlich, Reichenbach/Fils (DE); Kilian Friederich, Plochingen (DE); Ulrich Mowlai, Stuttgart (DE)

(73) Assignee: CeramTec AG, Plochingen (DE)

( * ) Notice: Subject to any disclaimer, the term of this patent is extended or adjusted under 35 U.S.C. 154(b) by 34 days.

(21) Appl. No.: 10/566,318

(22) PCT Filed: Aug. 6, 2004

(86) PCT No.: PCT/EP2004/008836
§ 371 (c)(1),
(2), (4) Date: Jun. 6, 2006

(87) PCT Pub. No.: WO2005/016847
PCT Pub. Date: Feb. 24, 2005

(65) Prior Publication Data
US 2007/0010392 A1    Jan. 11, 2007

(30) Foreign Application Priority Data
Aug. 7, 2003 (DE) ................................ 103 36 930
Jul. 21, 2004 (DE) ........................ 10 2004 035364

(51) Int. Cl.
*C04B 35/599* (2006.01)
*C04B 35/577* (2006.01)

(52) U.S. Cl. ..................... 501/98.2; 501/92; 501/98.3; 428/698; 428/704

(58) Field of Classification Search ............... 501/98.2, 501/98.3, 92; 428/698, 704
See application file for complete search history.

(56) References Cited

U.S. PATENT DOCUMENTS

| | | | | |
|---|---|---|---|---|
| 4,539,251 A | * | 9/1985 | Sugisawa et al. | 428/216 |
| 4,557,470 A | | 12/1985 | Link | |
| 4,818,635 A | * | 4/1989 | Ekstrom et al. | 428/698 |
| 4,826,791 A | | 5/1989 | Mehrotra et al. | |
| 4,880,755 A | * | 11/1989 | Mehrotra | 501/98.1 |
| 5,081,079 A | * | 1/1992 | Ukyo et al. | 501/98.1 |
| 5,200,374 A | | 4/1993 | Kohtoku et al. | |
| 5,411,923 A | | 5/1995 | Suzuki | |
| 5,965,471 A | * | 10/1999 | Brandt | 501/98.2 |
| 5,990,026 A | * | 11/1999 | Baek et al. | 501/98.1 |

* cited by examiner

*Primary Examiner*—Karl E Group
(74) *Attorney, Agent, or Firm*—Fulbright & Jaworski L.L.P.

(57) ABSTRACT

A material based on SiAlON contain 70-97 vol. % of alpha and beta-SiAlON and an amorphous or partially crystalline grain boundary phase and 3 to 30 vol.% of a hard material. The material has an alpha-SiAlON gradient which decreases from the outside to the inside.

15 Claims, 2 Drawing Sheets

MATERIALS BASED ON SIALON'S

Figure 1:
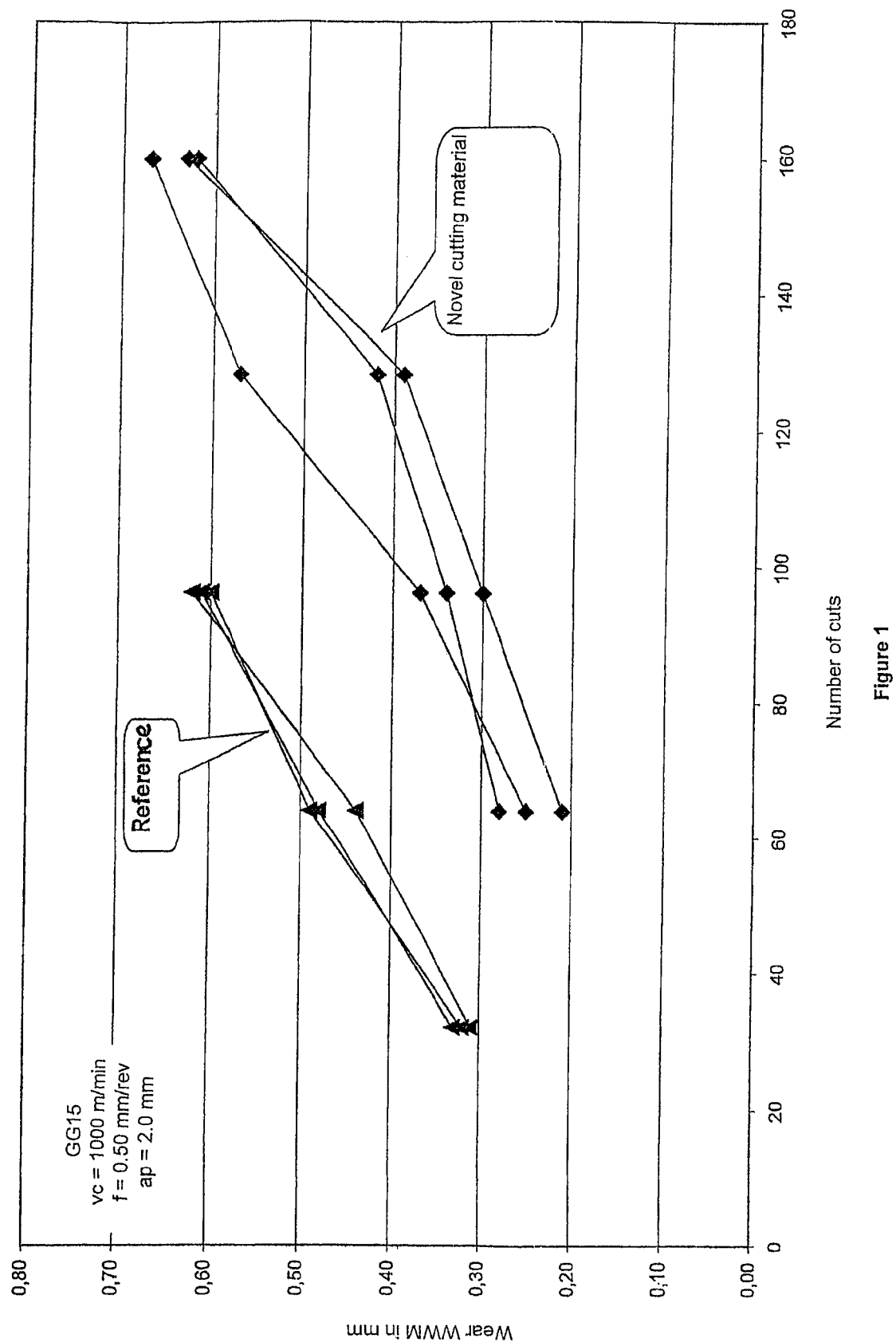

This is a §371 of PCT/EP2004/008836 filed Aug. 6, 2004 and claims priority from German Patent Application No. 103 36 930.9 filed Aug. 7, 2003 and German Patent Application No. 10 2004 035364.6 filed Jul. 21, 2004.

The present invention provides a material based on SiA-lONs, its production and use.

In the conventional long continuous cuts in grey cast iron, known $Si_3N_4$ and SiAlON cutting materials initially round very quickly at the cutting edge, a phenomenon known as initial wear.

The object of the present invention is therefore to eliminate this disadvantage of the known cutting materials.

This object is achieved according to the invention by the provision of a material which consists of components A and B, wherein A stands for an alpha-/beta-SiAlON and B for a hard material. The material according to the invention contains 70 to 97 vol. %, preferably 80 to 95 vol. %, particularly preferably 84 to 91 vol. % of component A and 3 to 30 vol. %, preferably 5 to 20 vol. %, particularly preferably 9 to 16 vol. % of component B.

The raw material mixture of the component A used according to the invention consists of the main constituents $Si_3N_4$, AlN, other additives such as e.g. $Al_2O_3$, $Y_2O_3$, $Sc_2O_3$, rare-earth oxides and small amounts of compounds containing Li, Ca, Mg, Sr. Comparable mixtures are already known from DE 35 11 734 A1. The material according to the invention is formed from the aforementioned raw material mixture and the added hard materials during a heat treatment at temperatures of 1800 to 2000° C. and retention times at the maximum temperature of 0.5 to 5 hours.

Component A consists of alpha- and beta-SiAlON and an amorphous or partially crystalline grain-boundary phase. In the material's sintered state the SiAlON phase inside the sintered compact consists of a proportion of alpha-SiAlON of 10 to 90 vol. %, preferably 12 to 60 vol. %, particularly preferably 15 to 50 vol. % and a proportion of beta-SiAlON of 90 to 10 vol. %, preferably 88 to 40 vol. %, particularly preferably 85 to 50 vol. % of beta-SiAlON. The proportion of alpha- and beta-SiAlON is determined from X-ray diffractometer images (according to Gazzara and Messier, J. Am. Ceram. Soc. Bull. 56 (1977)).

The content of grain-boundary phase is less than 10 vol. %, preferably less than 5 vol. %. The grain-boundary phase can be amorphous but should preferably be partially crystalline. As is known, the composition of A inside a sintered compact can be varied by means of the production parameters such as for example by means of the composition of the powder mixture, the sintering conditions in the oven, the crucible material, the type of gas, the temperature and the sintering time. In component A there can be a gradient between the surface and interior of the sintered compact such that the so-called as-fired surface contains up to 100% alpha-SiAlON.

A gradient can occur in component A under certain conditions when the surface of the sintered compact cools down more quickly than the interior or the chemical composition of the surface is modified by reactions with the atmosphere. An alpha-SiAlON-rich surface leads to a hard outer layer with a tough core.

Examples of hard materials, component B, that can be used are SiC, Ti(C,N), TiC, TiN, carbides and/or nitrides of elements from groups IVb, Vb and VIb of the periodic table, as well as scandium carbide and/or scandium oxycarbide or mixtures of the cited hard materials. During the heat treatment, hard materials are incorporated in an intergranular and/or intragranular manner, i.e. both between and in the SiAlON grains, and do not change during the heat treatment. The size of the hard material particles used should therefore not exceed the size of the other structural constituents, alpha- and beta-SiAlON grains, since otherwise the hard materials will cause the mechanical properties of the material according to the invention to deteriorate. This means that the average grain size of the hard materials should be less than 30 μm, preferably less than 15 μm, particularly preferably less than 5 μm. The hard material particles can be globular grains, platelets or whiskers, globular grains being particularly preferred.

The maximum size of the alpha- and beta-SiAlON grains should be less than 90 μm, preferably less than 65 μm, particularly preferably less than 50 μm. Whilst small grain sizes are usually desirable in the known materials, with the material according to the invention it has surprisingly been found that the grain size has only a minor influence on the application properties.

Heat treatment for crystallisation of the amorphous grain-boundary phase is possible and is even preferable. As is known, crystalline phases, particularly preferably aluminium-containing melilite or disilicate, are formed, depending on the production parameters such as composition of the powder mixture and sintering conditions such as temperature, gas composition, gas pressure, time course, insulating and crucible material.

The advantages of the material according to the invention in comparison to the known materials are its greater hardness at >1550 HV10 and hence its greater wear resistance.

Furthermore, the material according to the invention has a greater hot hardness, i.e. a higher wear resistance even at high cutting speeds, at which the temperature at the cutting corner increases.

Moreover, the chemical reactions of the vitreous phase with the material of the workpiece to be machined are substantially smaller, even at high cutting speeds.

The material according to the invention can be coated with the known wear-reducing coatings such as e.g. $Al_2O_3$, TiN or TiC, which increases the wear resistance.

The material according to the invention can be produced by methods known per se, such as are also used in the production of high-performance ceramic components, in particular SiAlON materials, by powder mixing, shaping, sintering and finishing by grinding.

The gas atmosphere during sintering should be inert and can be $N_2$ or a mixture of $N_2$ and other inert gases such as Ar for example.

The table below shows embodiment examples of compositions of the material according to the invention. The high hardness is noteworthy in each case.

TABLE

Composition and properties of the embodiment examples

| Weighed amount in kg | Ex. 1 | Ex. 2 | Ex. 3 | Ex. 4 | Ex. 5 |
|---|---|---|---|---|---|
| $Si_3N_4$ | 5.66 | 5.66 | 5.35 | 5.34 | 4.90 |
| $Y_2O_3$ | 0.32 | 0.32 | 0.30 | 0.30 | 0.27 |
| AlN | 0.29 | 0.29 | 0.27 | 0.27 | 0.25 |
| MgO | 0.01 | 0.01 | 0.01 | 0.01 | 0.01 |
| $Al_2O_3$ | 0.03 | 0.03 | 0.03 | 0.03 | 0.03 |
| SiC | 0.69 | 0.69 | 1.04 | — | — |
| Ti(C, N) | — | — | — | 1.05 | 1.53 |
| Max. sintering temp. | 1940° C. | 1800° C. | 1800° C. | 1800° C. | 1900° C. |

TABLE-continued

Composition and properties of the embodiment examples

| Weighed amount in kg | Ex. 1 | Ex. 2 | Ex. 3 | Ex. 4 | Ex. 5 |
|---|---|---|---|---|---|
| Retention time | 3 h | 1 h | 1 h | 1 h | 3 h |
| Final density | >99.9% th. | >99.9% th. | >99.9% th. | 99.9% th. | 99.9% th. |
| alpha-SiAlON or alpha + beta inside sample | 28% | 55% | 58% | 54% | 31% |
| Hard material content | 10 vol. % SiC | 10 vol. % SiC | 15 vol. % SiC | 10 vol. % TiCN | 15 vol. % TiCN |
| Colour | Grey-green | Grey-green | Grey-green | Grey-brown | Grey-brown |
| Hardness (HV10) | 1730 | 1810 | 1820 | 1810 | 1790 |

Final density: th. = theoretical density

Whilst the known $Si_3N_4$ and SiAlON cutting materials are light grey to dark grey-black, the material according to the invention is grey-green if SiC is added and grey-brown if Ti(C,N) is added.

As a cutting material, in the machining of grey cast iron with the conventional long continuous cuts, the material according to the invention surprisingly does not exhibit the disadvantages of the known cutting materials, initial wear, but instead retains a sharp edge up to the end of its operating life. It has also been recognised that the material according to the invention has surprisingly also proved advantageous in terms of so-called "notch wear": when grey cast iron with a particularly aggressive casting skin is cut, a deep notch forms in the previously known cutting materials after a short time. This wear is largely caused by chemical wear, i.e. chemical reactions between the material of the cutting tool and the material of the workpiece. The material according to the invention, on the other hand, displays such wear only after a considerably longer operating life.

Figure 2:
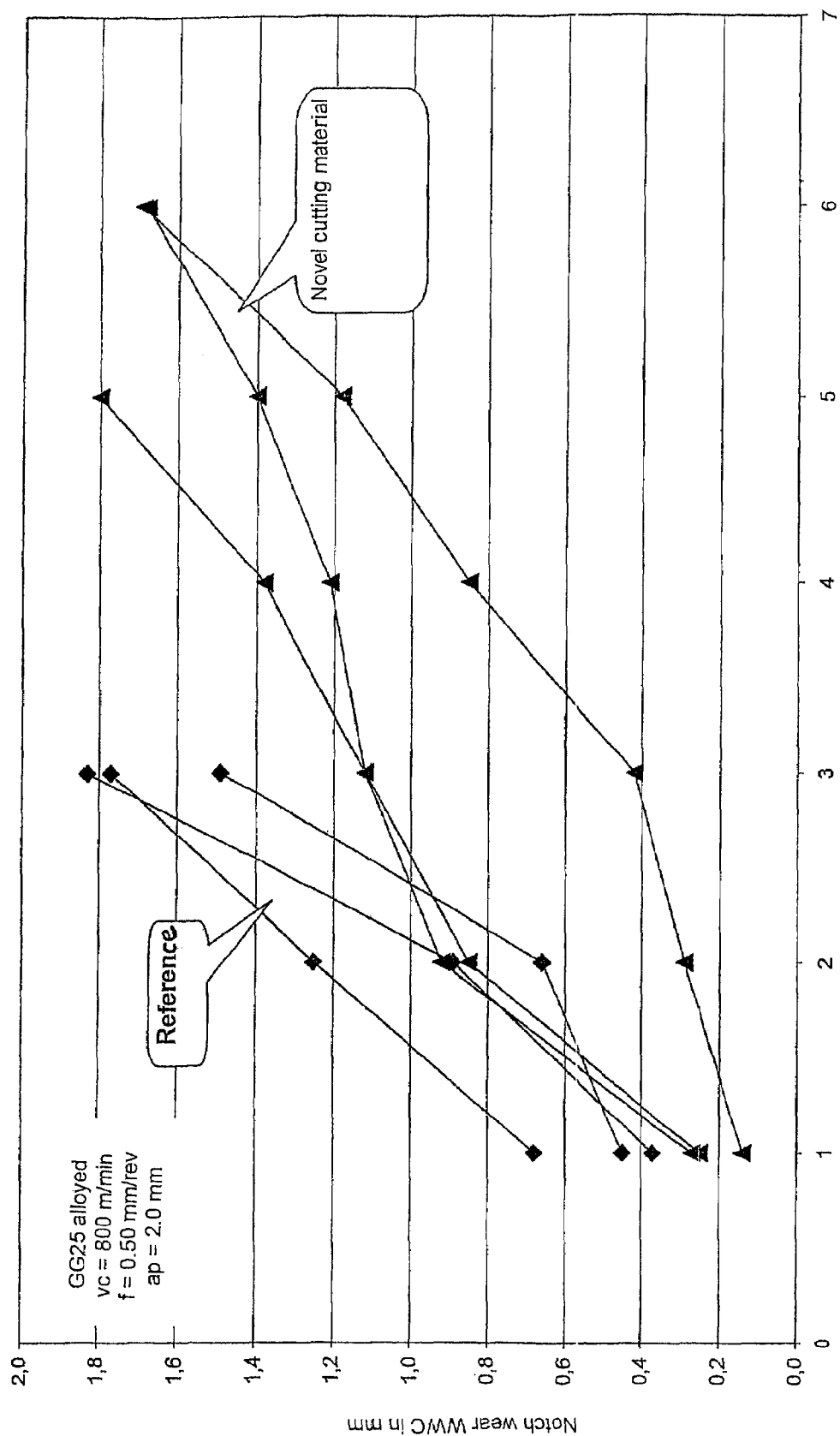

The advantage of the material according to the invention, "novel cutting material", in comparison to a silicon nitride material, "reference", can be seen from two diagrams, FIG. 1 and FIG. 2. FIG. 1 shows the width of wear on the main cutting edge, "WWM", as a function of the number of cuts. A brake disc made from GG15 (grey cast iron) was turned at a cutting speed (peripheral speed of turned part at the cutting edge) of "vc=1000 m/min" with a feed "f=0.5 mm/rev" and an advance (rate of cut) "ap=2.0 mm".

FIG. 2 shows the width of wear at the corner, "WWC", the notch wear during turning of alloyed grey cast iron, GG25, with casting skin, as a function of the number of cuts, again in comparison to a silicon nitride cutting tool. The part was turned at a cutting speed (peripheral speed of turned part at the cutting edge) of "vc=800 m/min" with a feed "f=0.5 mm/rev" and an advance (rate of cut) "ap=2.0 mm".

In addition to the use as a cutting material, other uses are also conceivable in other fields of application where high wear resistance is important and where there may also be thermal and chemical loads on the material. Thus an advantageous use of the material according to the invention as a sealing ring, for example, is conceivable or its use in fuel and coolant pumps, in compressors, turbochargers, heat exchangers and air conditioning systems.

The invention claimed is:

1. A compact comprising:
   80 to 95 vol % component A comprising alpha- and beta-SiAlON and a partially crystalline grain-boundary phase; and
   5 to 20 vol.% of component B comprising a hard material which is in globular form and an average grain size of from 1 to 5 microns;
   wherein the compact is sintered and has a sintered surface and a hardness of at least 1550 HV 10 and wherein said compact has an alpha-SiAlON gradient which decreases from the sintered surface to an inside of the sintered compact;
   wherein the sintered surface has an alpha-SiAlON content of up to 100%,
   wherein said hard material is SiC, wherein the state of the hard material remains unchanged after sintering;
   wherein the content of grain-boundary phase is less than 10 vol.% and comprises phases of aluminum containing melilite or disilicate;
   wherein in the inside of the sintered compact comprises from 15 to 50 vol.% alpha-SiAlON and
   wherein the amount of beta-SiAlON ranges from 50 to 85 vol.%.

2. The compact according to claim 1, wherein grain-boundary phase is less than 5 vol.%.

3. The compact according to claim 1, wherein the grain-boundary phase contains aluminum-containing melilite.

4. The compact according to claim 1, wherein a maximum grain size of the alpha- and beta-SiAlON is less than 90 μm.

5. The compact according to claim 1, coated with a wear-reducing coating.

6. A process for producing the compact of claim 1, comprising powder mixing, shaping, sintering and grinding.

7. A process according to claim 6, wherein component A is formed during a heat treatment at a temperature of from 1800 to 2000° C. a retention time at the maximum temperature of 0.5 to 5 hours.

8. A process according to claim 6, wherein sintering is conducted in an inert atmosphere.

9. The compact produced by the process of claim 6.

10. The compact according to claim 5, wherein said wear-reducing coating comprises at least one of $Al_2O_3$, TiN or TiC.

11. A process according to claim 8, wherein sintering is conducted in a gas atmosphere that comprises $N_2$ or a mixture of $N_2$ and another inert gas.

12. A process according to claim 8, wherein the inert gas comprises argon.

13. A compact comprising:
   80 to 95 vol % component A comprising alpha- and beta-SiAlON and a partially crystalline grain-boundary phase; and
   5 to 20 vol.% of component B comprising a hard material which is in globular form and an average grain size of less than 30 microns;
   wherein the compact is sintered and has a sintered surface and a hardness of at least 1550 HV 10 and wherein said compact has an alpha-SiAlON gradient which decreases from the sintered surface to an inside of the sintered compact;
   wherein the sintered surface has an alpha-SiAlON content of up to 100%,
   wherein said hard material is SiC, wherein the state of the hard material remains unchanged after sintering;

wherein the content of grain-boundary phase is less than 10 vol.% and comprises phases of aluminium containing melilite or disilicate;

wherein in the inside of the sintered compact comprises from 15 to 50 vol.% alpha-SiAlON and wherein the amount of beta-SiAlON ranges from 50 to 85 vol.%.

14. The compact of claim 13, wherein said average grain size of said hard particles is less than 15 microns.

15. The compact of claim 13, wherein said average grain size of said hard particles is less than 5 microns.

\* \* \* \* \*